United States Patent [19]  [11] 4,007,469
Land et al. [45] Feb. 8, 1977

[54] PHOTOGRAPHIC APPARATUS WITH PLURALITY OF SELECTIVELY DETERMINABLE OPERATIONAL MODES

[75] Inventors: Edwin H. Land, Cambridge; Richard C. Kee, Chestnut Hill, both of Mass.

[73] Assignee: Polaroid Corporation, Cambridge, Mass.

[22] Filed: Apr. 21, 1975

[21] Appl. No.: 570,165

[52] U.S. Cl. .............................. 354/27; 354/23 D; 354/33; 354/53; 354/128; 354/133

[51] Int. Cl.$^2$ .................... G03B 7/14; G03B 15/03

[58] Field of Search ....................... 354/27, 32–35, 354/53, 126–128, 129, 133, 145, 207, 230

[56] References Cited
UNITED STATES PATENTS

| | | | |
|---|---|---|---|
| 3,374,718 | 3/1968 | Hochreiter | 354/35 |
| 3,374,720 | 3/1968 | Harvey | 354/143 |
| 3,651,372 | 3/1972 | Uchida et al. | 354/127 |
| 3,688,664 | 9/1972 | Mashimo | 354/33 |
| 3,868,700 | 2/1975 | Kuramoto | 354/288 |
| 3,903,528 | 9/1975 | Kee | 354/230 |

*Primary Examiner* — L. T. Hix
*Assistant Examiner* — J. A. LaBarre
*Attorney, Agent, or Firm* — E. S. Roman; J. W. Ericson

[57] ABSTRACT

A camera is provided with a built-in electronic flash unit, a viewfinder for simultaneously framing an image and for selectively displaying a number of indications, a circuit for sensing the state of charge of the flash unit and the ambient light level, a pair of shutter buttons, and apparatus controlled by both the shutter buttons and the sensing circuit for selectively making a flash exposure, making an ambient light exposure, or displaying an appropriate indication to the operator.

20 Claims, 8 Drawing Figures

U.S. Patent  Feb. 8, 1977  Sheet 1 of 3  4,007,469
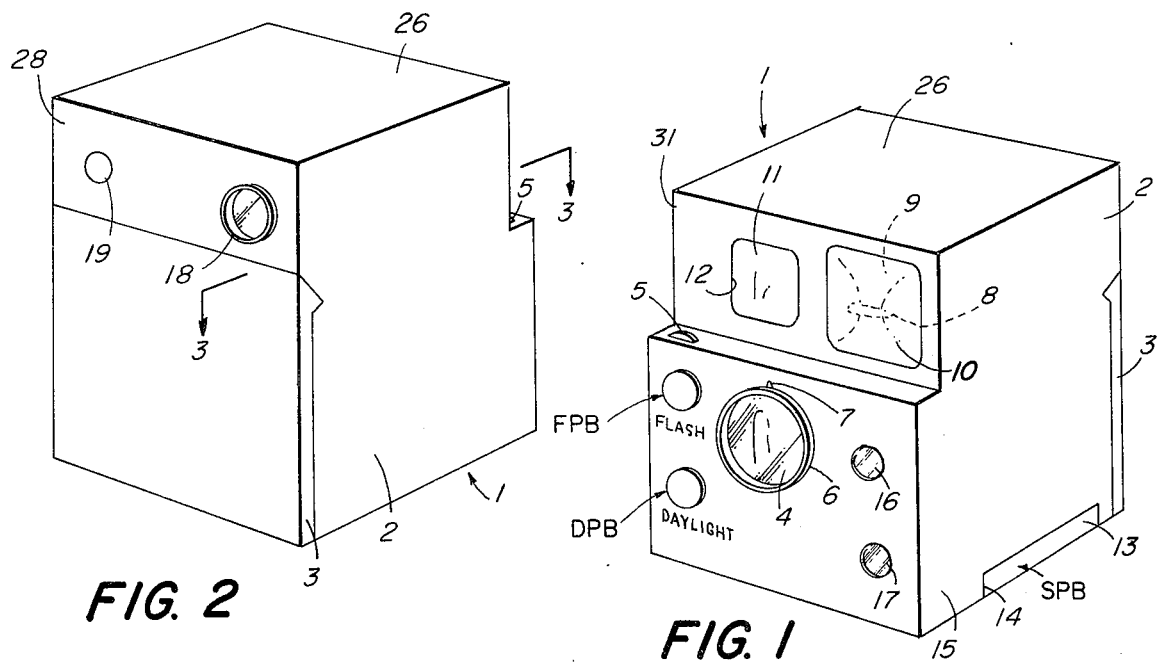
FIG. 2
FIG. 1
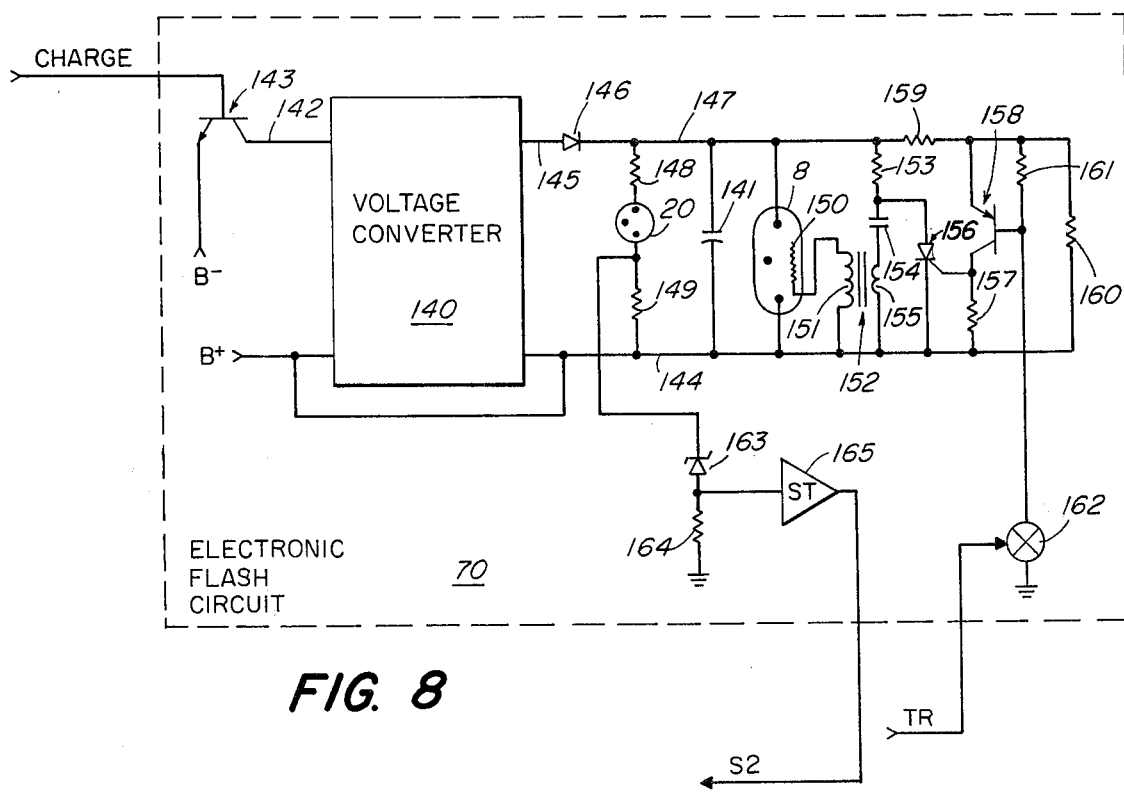
FIG. 8

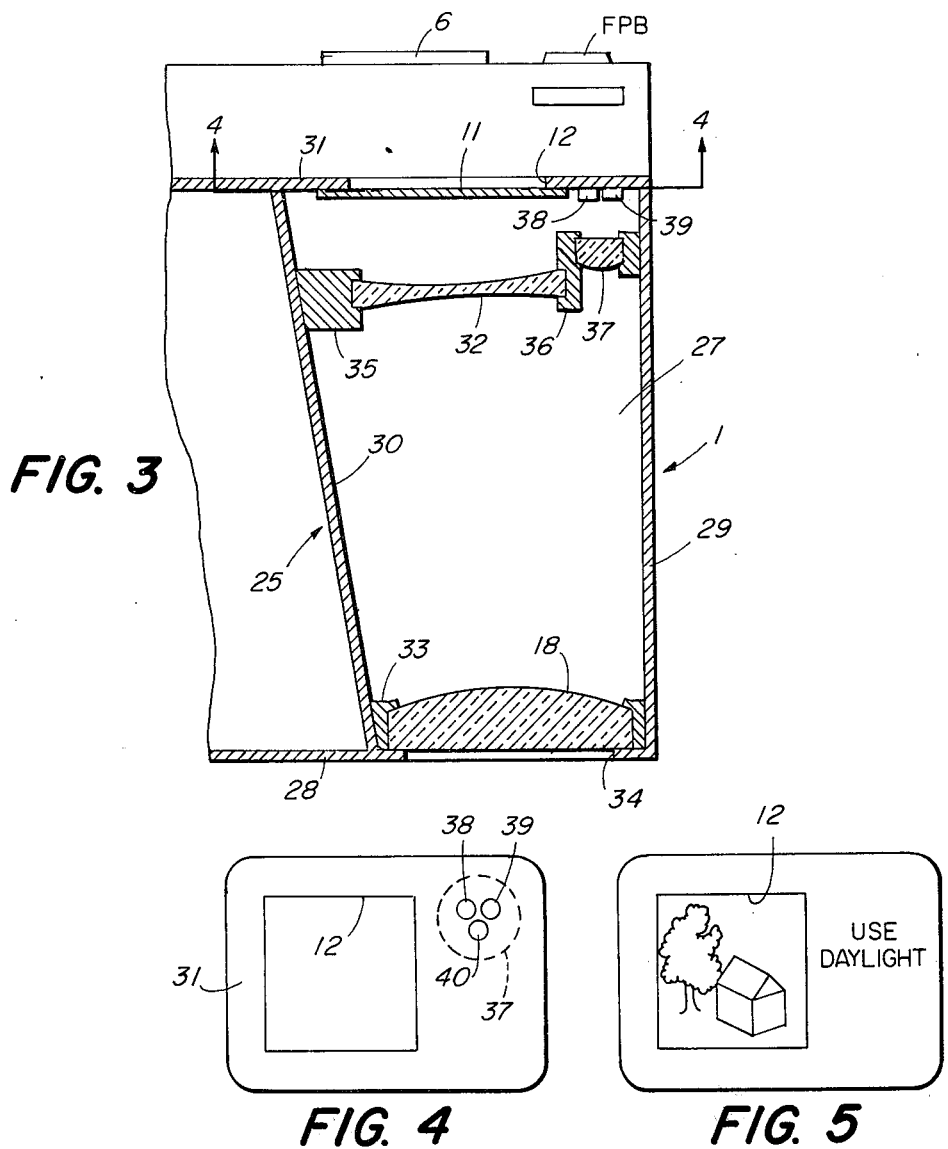
FIG. 3
FIG. 4
FIG. 5
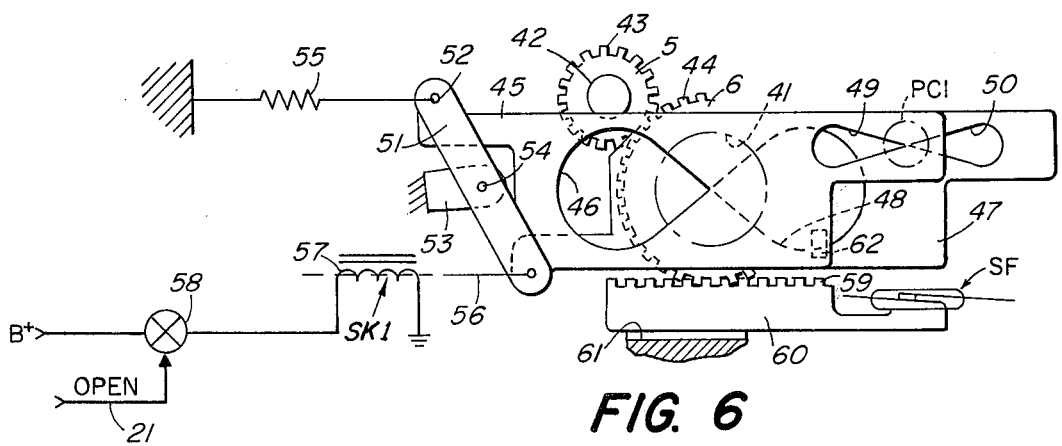
FIG. 6

PHOTOGRAPHIC APPARATUS WITH PLURALITY OF SELECTIVELY DETERMINABLE OPERATIONAL MODES

This invention relates to photography, and particularly to a novel electronic flash camera.

As technology advances, the variety of materials, apparatus and methods available to the photographer continues to increase. To the professional photographer, or to the advanced amateur, the selection of exactly the right combination of equipment and sensitive materials for a particular purpose is a fascinating pursuit. To the amateur, however, who may be a beginner in photography or who only wants to take pictures on occasion, without any desire to study the mysteries of the art, the apparatus that is simplest to operate has the widest appeal.

The utmost in photographic simplicity is normally associated with the greatest restrictions on the circumstances under which the camera can be used successfully. Thus, the conventional box camera, with its fixed speed, fixed aperture and fixed focus does reasonably well under only a rather limited range of conditions. Even the beginner is frequently not satisfied with these restrictions, and desires to add flashbulbs, or an electronic flash unit, to his apparatus in order to make it possible to take pictures under low lighting conditions, such as indoors. This apparently simple addition to the photographic system, however, introduces numerous opportunities for error.

Flashbulbs may be forgotten, or if there is one in place on the camera, the photographer may forget to change it after it is fired. Electronic flash units must be charged, and it is easy to forget to do so. Then there is the matter of choice between the use of flash and the use of the ambient light to make a picture. This choice is straightforward to the expert, but can be puzzling to the beginner.

Of the many suggestions for the solutions of these problems that appear in the art, two are typical. One is to give the photographer complete freedom of choice, as suggested in U.S. Pat. No. 3,374,720, granted on Mar. 26, 1968 to D. M. Harvey. This patent shows a camera equipped with two shutter buttons, one for daylight and one for flash. The latter is operative, when a flash cube is in place on the camera, to make a flash exposure and index the flash cube.

Another approach, illustrated by U.S. Pat. No. 3,785,259, granted on Jan. 15, 1974 to Kiyoshi Kitai, allows the user either to choose whether or not to use flash, or to set the camera automatically to use flash if needed. This latter feature deprives the user of the choice, unless it is intentionally defeated. Moreover, it involves the difficulty that if two or three pictures are taken and the flash bulb does not go off, and another picture is then taken under somewhat reduced light conditions and the flash bulb does go off, the unexpected flash may startle the photographer into dropping the camera.

It is the object of this invention to simplify the external aspects of cameras which may be used for flash or daylight exposures, while improving the chances that the photographer will produce a properly exposed photograph under a wide variety of conditions, and, at the same time, to educate the user in his choice of the use of ambient light or artificial light under various conditions.

Briefly, the above and other objects of the invention are obtained by a novel selection of elements for use in combination which together make it possible for the photographer to take a picture that is properly exposed under a wide variety of conditions, with little delay if he is a beginner, and with essentially no delay after he has used the camera for a time. In accordance with the invention, the camera is provided with a built-in electronic flash unit, with any conventional means for framing and focusing the camera, and with first and second shutter buttons. The framing device preferably comprises a viewfinder in which there is a plurality of selectively illuminable indicators, each responsive to a different set of conditions to produce an indication that the photographer should do something other than what he has just done in order to produce a correct exposure.

Two photosensitive devices are preferably provided, one arranged to be illuminated through an aperture corresponding to the current aperture of the camera's lens, and the other arranged to be illuminated through a fixed aperture. The first photosensitive element directs the closing of the shutter after an exposure time sufficient to produce a proper exposure in an ambient mode of operation of the camera. The second photosensitive device determines the ambient light level at the time that one of the shutter buttons is operated, and aids in determining the mode of operation of the camera after one of the shutter buttons is actuated.

A first of the two shutter buttons, when operated alone, directs a flash exposure to be made with the aid of the electronic flash unit. If the flash unit is charged, and the light level is too low for a sharp hand-held daylight exposure, actuating this first button will immediately produce a flash exposure with the camera in a follow-focus mode of exposure control. If the electronic flash unit is not charged, and the light level is low, a visible indication that the operator should wait for a recharging of the flash unit is commenced. If the light level is high when the flash button is depressed, whether or not the flash unit is charged, a visual indication that the operator should use the other shutter button to produce an ambient exposure is produced.

When the second button, associated with daylight exposures, is depressed, if there is an adequate light to make a sharp hand-held exposure, the camera will proceed to make such an exposure. On the other hand, if the light is too low for a successful hand-held exposure, an indication will be produced that the operator should either use a time exposure or the flash exposure button.

When both shutter buttons are depressed simultaneously, a time exposure will be made by the camera. Apparatus is preferably provided to allow this mode of operation even though one button is touched shortly before the other.

A grip switch is preferably provided which is closed when the operator is holding the camera in a normal position. This grip switch serves to connect the battery in the camera to control circuits which effect the exposure and indication functions described above. The control circuits are preferably low level integrated circuits which require very little power for operation. The power consuming elements in the camera, such as a solenoid for operating the shutter, a film transport motor, if one is provided, and the electronic flash charging circuit, are preferably not connected to the battery until their use is required.

When the electronic flash unit is charged, it is preferably arranged to be disconnected after a predetermined time, if no flash picture is taken during that time, or to be disconnected from the charging circuit when a flash picture is taken. This preferred mode of operation may be carried out in the manner and for the purposes more fully described and claimed in copending U.S. application for Letters Pat. Ser. No. 501,503, filed on Aug. 29, 1974 by Conrad H. Biber for Single Trigger Photographic Strobe Unit and assigned to the assignee of this application. The apparatus is preferably provided with a conventional ready light, to indicate whether or not the flash unit is charged.

With a camera constructed as just generally described, the operator quickly learns how to take an electronic flash picture essentially immediately, and yet very little power is required compared to the use of a camera with a conventional electronic flash unit. For this purpose, the photographer can pick up the camera, thus closing the grip switch, and touch the flash button before preceding to focus and view the scene to be photographed. The usual interval required for focusing and framing is longer than the time normally needed to charge the flash unit, so that by the time the operator is ready to make the exposure, the ready light will probably be on and the flash unit ready for an immediate exposure. If the beginner attempts to make a flash exposure before the unit is charged, he will get an indication to wait, and no exposure will be wasted. Similarly, if the daylight button is pushed, and the light is too low for a successful photograph, an indication will be produced, no exposure will be wasted, and the operator can proceed to take a time exposure using a suitable support for the camera.

The manner in which the apparatus of the invention is constructed, and its mode of operation, will best be understood in the light of the following detailed description, together with the accompanying drawings, of a preferred embodiment of the invention.

In the drawings,

FIG. 1 is a schematic perspective sketch of a camera in accordance with the invention;

FIG. 2 is a three-quarter rear view of the camera of FIG. 1;

FIG. 3 is a schematic cross-sectional plan view of a viewfinder forming a portion of the camera of FIG. 1, taken essentially along the lines 3—3 in FIG. 2;

FIG. 4 is a schematic sketch of the inside front cover of the viewfinder of FIG. 3, taken essentially along the lines 4—4 in FIG. 3;

FIG. 5 is a schematic sketch illustrating the appearance of a scene through the viewfinder when a visual indication is being produced;

FIG. 6 is a schematic sketch of the shutter and its operating mechanism in the camera of FIGS. 1 and 2;

FIG. 8 is schematic block and wiring diagram of an electronic flash unit forming a part of the apparatus of FIGS. 1 and 2.

Figure 7:
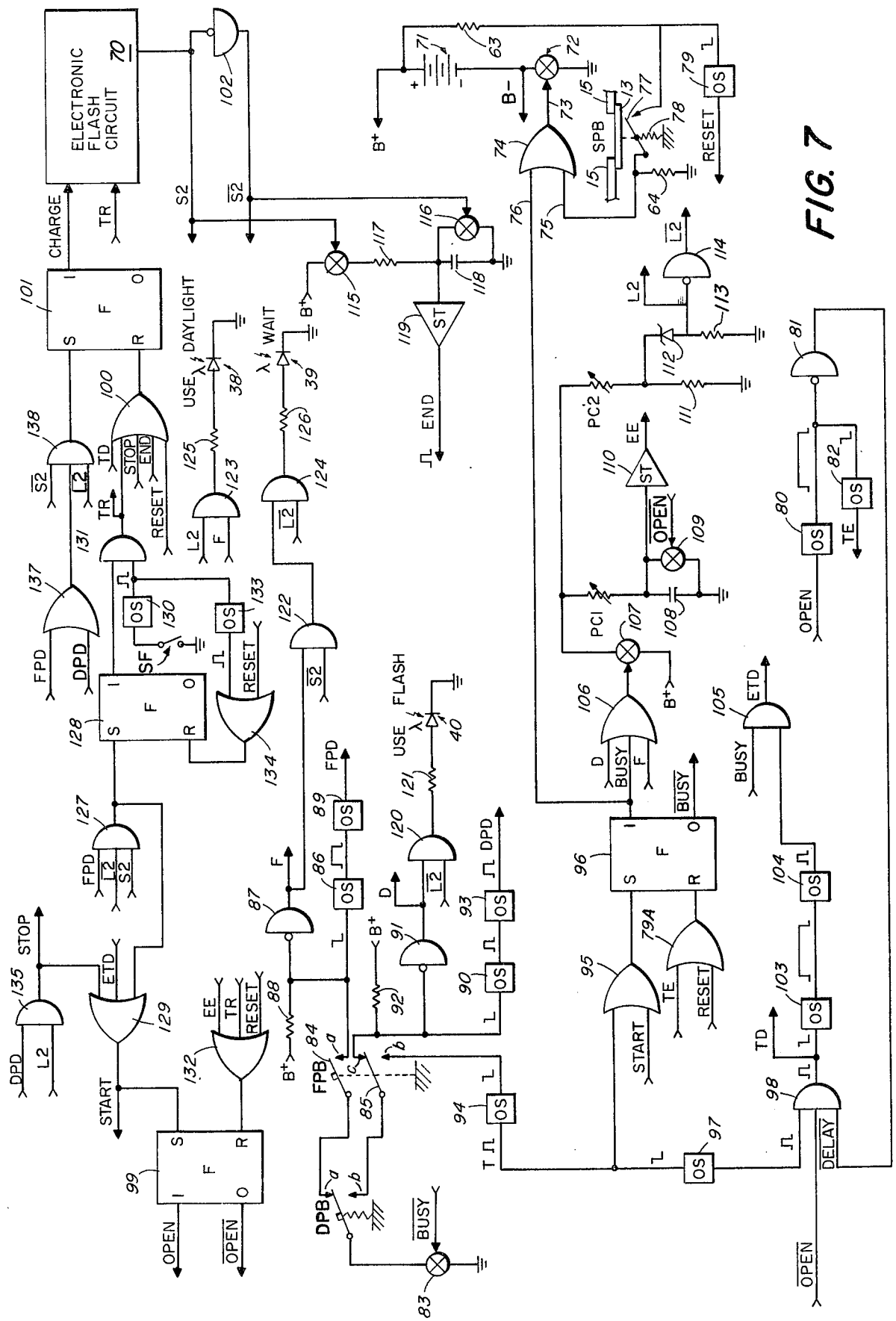
FIG. 7 is a schematic block and wiring diagram of a control circuit forming a part of the camera of FIGS. 1 and 2.

Referring first to FIGS. 1 and 2, there is shown a camera 1 which may be of any conventional construction except in the particular respects to be described. The camera 1 comprises a housing generally designated 2 and formed in any conventional manner with door 3 through which film can be loaded and through which a battery, to be described, can be inserted or removed.

The camera may be arranged in any conventional way to accept conventional photosensitive materials, such as conventional negative materials in roll or sheet form, or self-processing film units of any conventional variety.

As indicated in FIG. 1, the camera is provided with a conventional lens 4 arranged to be focused by a focusing knob 5 and mounted in a barrel 6 which rotates with the lens as it is focused, thus moving an indicator 7 attached to the barrel 6 relative to a focusing scale on the front of the camera. Alternatively, a conventional range finder may be provided if so desired.

Built into the main housing 2 of camera 1 is an electronic flash unit comprising a flash discharge tube 8 located in a suitable reflector 9 behind a lens 10 that serves to focus light from the flash lamp into the zone of view of the camera.

Besides the electronic flash unit in the upper portion of the housing 2 is a viewfinder, to be more fully described in connection with FIG. 3. As seen in FIG. 1, the viewfinder comprises a front window 11, of glass, plastic, or the like, in a frame defining aperture 12 in the housing 2.

The camera 1 is provided with two shutter buttons, a first pushbutton FPB, labeled FLASH on the camera to designate its primary function, and a second shutter button DPB, labeled DAYLIGHT on the camera to indicate its primary function. A grip switch SPB, to be more fully described below in connection with FIG. 8, comprises a spring-loaded panel 13 set behind a suitable aperture 14 in a side wall 15 of the left side of the camera, in position to be automatically depressed by the operator when holding the camera in any convenient way for its operation. This grip switch SPB serves to supply power to the camera when the operator picks it up to use it, and interrupts the supply of power when the camera is put down, unless the circuits are then latched into a time exposure mode of operation in a manner to be described.

A first window 16 in the front of the camera 1 exposes a photocell through selectively controlled apertures, to be described, so that the photocell is exposed to a scene, to be photographed through the taking lens 4, through the same aperture as the taking lens is then opened to. A second photocell window 17 exposes another photocell, to be described, at a constant aperture.

Referring next to FIG. 2, the external features apparent from the rear of the camera 1 comprise a lens 18 forming the eyepiece of the viewfinder to be described below, and a window 19 through which a conventional ready light 20, to be described in connection with FIG. 8 below, is visible when illuminated.

Referring next to FIG. 3, the viewfinder is generally designated 25. Comparing FIGS. 1 and 3, the viewfinder is confined in a chamber defined by the upper wall 26 of the rear portion of the camera, an intermediate wall 27, shown in FIG. 3, which defines a portion of a lighttight film exposure chamber in the camera, the rear wall 28 of the camera, the right side wall 29 of the camera, and an internal wall 30.

As described above, the framing aperture 12 is formed on the front wall 31 of the camera. The image-framing function of the viewfinder 25 is performed by a conventional Galilean system comprising a front objective lens 32, which is divergent or negative in power, and the positive eyepiece lens 18 described above. The frame 12 is preferably located ahead of the negative component 32 to be more sharply seen as the outline of the scene to be photographed.

The eyepiece 18 is secured in the camera by retaining means suggested at 33 in position behind a viewing aperture 34 formed in the wall 28. The negative component 32 is secured by mounting means indicated at 35 and 36. The support 36 also serves to secure a positive lens 37 in the camera. The lens 37 and 18 form a magnifying system focusing an image of three light-emitting diodes 38, 39 and 40, shown in FIGS. 3 and 4. The light-emitting diodes are painted black and have scribed through the black paint a visual sign, such as the sign USE DAYLIGHT. When one of these diodes is so illuminated, such as the one bearing the legend USE DAYLIGHT, and the user of the camera looks through the eyepiece 18, he sees the scene to be photographed through the framing aperture 12 and the visual indication, if produced, in the dark region to the right of the frame, as suggested in FIG. 5.

FIG. 6 shows a shutter mechanism suitable for use in the camera of FIGS. 1 and 2. As shown, the focusing knob 5 is rotatably mounted on a shaft 42, the latter being secured in the camera in any conventional manner, and formed with teeth 43 that mesh with teeth 44 formed on the barrel 6 of the lens. A dotted circle 4 indicates the maximum aperture of the lens 4 in FIG. 1.

A first shutter blade 45 is formed with a tear-shaped aperture 46, and a second shutter blade 47 is formed with a similar and oppositely directed tear-shaped aperture 48. The shutter blades 45 and 47 close the aperture 41 in the position of the parts shown.

A similar but smaller tear-shaped aperture 49 is formed on the blade 45, and a corresponding oppositely directed tear-shaped aperture 50 is formed on the blade 47. In the position of the parts shown, these apertures are not overlapping, so that a photocell PC1, located behind the blades as suggested in FIG. 6, is not exposed.

The shutter blade 45 is pivotally mounted to one end of a walking beam 51 as suggested at 52. The blade 47 is similarly connected to the other end of the beam 51. The beam 51 is centrally pivoted to a suitable support 53 as suggested at 54. The blades 45 and 47 are normally urged to the position shown, in which the shutter is closed and the photocell PC1, mounted behind the window 16, is blocked against receiving light, by a spring schematically indicated at 55 connected between the upper end 52 of the walking beam 51 and the frame of the camera.

The blades 45 and 47 are at times driven to a position in which the aperture 41 of the lens is fully exposed when a solenoid SK1 is energized. As schematically indicated, the armature 56 of the solenoid SK1 is connected to the lower end of the walking beam 51, so that when the winding 57 of the solenoid is energized, the walking beam is rotated clockwise against the force of the spring 55.

As shown, the solenoid SK1 has an energizing circuit that is at times completed from a supply terminal at a potential B+ through the load terminals of a conventional electronic switch 58, and thence through the winding 57 of the solenoid SK1 to ground. The electronic switch 58 has a control terminal 21. The switch 58 is closed when a positive potential with respect to ground is applied to the control terminal 21. Such a signal is present, as a positive voltage labeled OPEN, under conditions to be described. When the signal OPEN is not present, the switch 58 is open, and no current flows through the solenoid SK1.

The teeth 44 on the lens barrel 6 mesh with corresponding teeth 59 formed on a rack 60 that is slideably mounted in the camera and guided by a support generally designated 61 for translation to the left or to the right in FIG. 6 under the direction of the focus knob 5. A magnetic reed switch SF is mounted on the rack 60, and is arranged to be closed by a small permanent magnet 62 mounted on the shutter blade 45 at an aperture produced by the blades 45 and 47 that is determined by the focused position of the knob 5. Closure of the switch SF is used to direct the closing of the camera shutter in a manner to be described below, when the apparatus is in a follow focus mode of operation used for electronic flash exposures.

FIG. 7 shows a control circuit for the camera of FIGS. 1 through 6. The control circuit includes an electronic flash circuit 70, shown in block form in FIG. 7 and to be described in somewhat more detail in connection with FIG. 8 below.

Referring to FIG. 7, the camera is provided with a conventional battery 71, which is preferably of the replaceable type. When the battery 71 is in place in the camera, its positive terminal is connected to the supply terminal at B+, and its negative terminal provides a voltage B− that is directly connected in the electronic flash circuit 70 in a manner and for purposes to appear. The negative terminal of the battery is connected to ground, which is the return terminal for all of the other apparatus in the camera, through a normally open electronic switch 72 of any conventional design.

The switch 72 may be of any conventional variety, and arranged to be closed when a positive signal is applied to its control terminal 73 with respect to ground. The control terminal 73 is at times supplied with a positive signal, causing the closing of the switch 72, by a logic 1 signal, that is to say, positive with respect to ground, produced by the output terminal of an OR gate 74 in response to a logic 1 signal applied to either of its two input terminals 75 and 76.

As indicated in FIG. 7, the grip switch SPB comprises a resiliently biased panel 13 connected to the armature 77 of a normally open switch, urged towards it open position by a spring 78. When the switch SPB is closed, a circuit is completed from the supply terminal at B+ through a first resistor 63, over the contacts of the switch SPB, and thence through a second resistor 64 to ground. The voltage then appearing across the resistor 64 is supplied as a logic 1 signal to the input terminal 75 of the OR gate 74. At the same time, the falling transition produced at the junction of the lower terminal of the resistor 63 when the switch SPB is closed is used to trigger a conventional one-shot multivibrator 79 to produce a positive pulse labeled RESET. The RESET pulse is used to reset a number of flip-flops, to be described, in a manner and for purposes to appear, when the camera is first picked up by the operator.

The daylight pushbutton DPB and the flash pushbutton FPB are connected in an operational mode control circuit, next to be described. The pushbutton DPB is a conventional spring-returned pushbutton having a normally closed contact $a$ and a contact $b$ that is closed when the pushbutton is depressed.

The armature of the switch DPB is connected to ground through the load terminals of a normally open electronic switch 83. The switch 83 is closed when a positive logic one signal, labelled $\overline{BUSY}$, is applied to its control terminal.

The switch FPB comprises a conventional spring-returned pushbutton having two armatures 84 and 85. The armature 84 is connected to contact *a* of the switch DPB, and the armature 85 is connected to contact *b* of the switch DPB.

The armature 84 engages a contact *a* when the switch FPB is depressed. At the same time, the armature 85 engages a contact *b*. When the switch FPB is released, the armature 85 of the switch FPB engages a contact *c*. Preferably, referring briefly to FIG. 1, the pushbutton DPB is made to protrude slightly farther from the camera than the pushbutton FPB, so that if an attempt is made to depress both pushbuttons at the same time, contact *a* of the switch DPB will be disengaged before contact *a* of the switch FPB is engaged. Further provision against inadvertent operation of this kind can be made by making the contacts of the switches DPB and FPB of the break before make variety.

It will be recalled that the negative terminal of the battery 71 is only connected to ground when the switch 72 is closed. To simplify the following discussion, it will be assumed that the switch 72 is closed unless specifically noted.

The contact *a* of the pushbutton FPB is connected to the active input terminal of a conventional one shot multivibrator 86, to the active input terminal of a conventional NOR gate 87, and to one terminal of a resistor 88. The resistor 88 is connected to the supply terminal at B+. With this construction, when the switch 83 is closed, the pushbutton DPB is released, and the pushbutton FPB is depressed, a falling potential will be produced at the input terminal of the one shot multivibrator 86, causing it to produce a positive output pulse. The low potential at this terminal will also cause the gate 87 to produce a positive or logic 1 signal with respect to ground, labeled F.

The pulse from the one shot multivibrator 86 is selected to have a duration sufficient to allow proper operation of photocell light level detecting circuits, to be described. If photocells of sufficiently short response time are provided, this one shot multivibrator 86 and its function can be omitted.

At the trailing edge of the pulse produced by the multivibrator 86, a conventional one shot multivibrator 89 is triggered to produce an output pulse that is positive with respect to ground and is labeled FPD. This pulse either initiates a flash exposure, or starts charging of the flash unit, or has no effect, depending on other conditions to be described.

The contact *c* of the switch FPB is connected to the active input terminal of a conventional one shot multivibrator 90, to the active input terminal of a conventional NOR gate 91, and to one terminal of a resistor 92. The other terminal of the resistor 92 is connected to the supply terminal at B+. By this arrangement, with the switch 83 closed, the pushbutton DPB depressed, and the pushbutton FPB released, a falling potential is produced at the input terminal of the one shot multivibrator 90 that causes it to produce a positive output pulse of the same duration as the pulse produced by the one shot multivibrator 86, and for the same purpose. At the same time, the low potential at the input terminal of the gate 91 causes a logic one signal labeled D to be produced at the output terminal of the gate 91 for purposes to appear.

The trailing edge of the output pulse from the one shot multivibrator 90 triggers a conventional one shot multivibrator 93 to produce a positive output pulse labeled DPD. This pulse either initiates an ambient light exposure, or initiates the charging of the flash circuit, depending on other conditions in a manner to be described.

The contact *b* of the pushbutton FPB is connected to the active input terminal of a conventional one shot multivibrator 94. When the switch 83 is closed, and both the pushbuttons DPB and FPB are simultaneously depressed, the groundward transition produced on contact *b* of the switch FPB triggers a multivibrator 94 to produce a positive output pulse labeled T.

The pulse T preferably has a duration slightly longer than the duration of the pulses produced by the multivibrators 86 and 90, for purposes to appear. The pulse T is applied to one input terminal of a conventional OR gate 95. A second input terminal of the gate 95 receives a signal labeled START, produced in a manner to be described below. When either the pulse T or the signal labeled START is applied to the gate 95, a logic one signal is produced at its output terminal that causes a flip-flop 96 to be set, unless it is already set.

The trailing edge of the pulse T triggers a conventional one shot multivibrator 97, causing the multivibrator 97 to produce a positive pulse. This pulse is applied to one input terminal of a conventional AND gate 98. A second input terminal of the gate 98 receives the signal $\overline{OPEN}$, produced at the logic 0 terminal of a flip-flop 99 when that flip-flop is reset. A third input terminal of the gate 98 receives a signal $\overline{DELAY}$, produced in a manner to be described.

When the one shot multivibrator 97 produces an output pulse and the signals $\overline{OPEN}$ and $\overline{DELAY}$ present, the output pulse from the multivibrator 97 will be repeated on the output terminal of the gate 98, producing a positive pulse labeled TD.

The pulse TD is applied to an OR gate 100, causing the gate 100 to produce a pulse that serves to reset a flip flop 101, for purposes to appear. The trailing edge of the pulse TD triggers a conventional one shot multivibrator 103, causing the multivibrator 103 to produce a positive output pulse.

The duration of the pulse produced by the multivibrator 103 may simply be ample to insure that the longest permissable hand-held daylight exposure has been completed, or it may be sufficiently long, for example, ten seconds, so that the photographer can put the camera down on a support and either frame the picture, or get into the picture himself if he so desires, before the time exposure is commenced. At the trailing edge of the pulse produced by the multivibrator 103, a conventional multivibrator 104 is triggered to produce a positive pulse.

The pulse produced by the multivibrator 104 may be of short duration, simply long enough to set a flip flop. This pulse is applied to one input terminal of a conventional AND gate 105. A second input terminal of the gate 105 receives a signal BUSY, present at logic one when the flip flop 96 is set. The output signal produced by the gate 105 when the multivibrator 104 produces a pulse in the presence of the signal BUSY is a positive pulse labeled ETD, used to initiate a time delay exposure in a manner to be described.

An OR gate 106 has three input terminals, each receiving a different one of the signals D, F and BUSY. The output terminal of the gate 106 is connected to the control terminal of a conventional electronic switch 107, causing the switch 107 to be closed when any of the signals D, F or BUSY is present. The load terminals of the switch 107 are connected in a circuit which extends from the supply terminal at B+, through the switch, and thence through the photocell PC1 and a capacitor 108 to ground. An electronic switch 109 has its load terminals connected in parallel with the capacitor 108, and a control terminal connected to receive the signal $\overline{OPEN}$, causing the switch 109 to be closed when the flip flop 99 is reset.

The junction of the capacitor 108 and the photocell PC1 is connected to the active input terminal of a conventional Schmitt trigger circuit 110. When the switch 107 is closed and the switch 109 is opened, and the voltage across the capacitor 108 rises to a value indicating a sufficient exposure of the film, the Schmitt trigger 110 produces a positive pulse labeled EE. This pulse serves to terminate exposure by closing the shutter in a manner to be described.

An ambient light level sensing photocell PC2 is connected in a circuit which extends from the supply terminal at B+ through the load terminals of the switch 107, through the photocell PC2, and thence through a fixed resistor 111 to ground. The junction of the resistor 111 and the photocell PC2 is returned to ground through a Zener diode 112 in a series with a fixed resistor 113.

The photocell PC2 senses ambient light as seen through the window 17 in FIG. 1. When the switch 107 is closed, and the ambient light level is high enough to produce a sharp hand-held exposure, the voltage across the resistor 111 will be high enough so that the Zener diode 112 will conduct, producing a positive voltage across the resistor 113 labeled L2. This signal is inverted by a conventional NOR gate 114 to produce a signal $\overline{L2}$, present when the ambient light level is too low to produce a sharp hand-held exposure.

When the electronic flash unit 70 is fully charged, it produces a positive signal $\overline{S2}$ in a manner to be described. This signal is applied to the active input terminal of a conventional NOR gate 102, to produce a complimentary signal $\overline{S2}$. When the signal $\overline{S2}$ is present, it indicates that the flash unit is not fully charged.

The signal S2 is also applied to the control terminal of a conventional electronic switch 115, causing the switch to be closed when the signal S2 is present. The signal $\overline{S2}$ is applied to the control terminal of an electronic switch 116, causing that switch to be closed when the signal $\overline{S2}$ is present.

A timing circuit extends from the supply terminal at B+ through the load terminals of the switch 115, and thence through a resistor 117 and a capacitor 118 to ground. The load terminals of the switch 116 are connected across the capacitor 118, as shown.

The junction of the resistor 117 and the capacitor 118 is connected to the active input terminal of a conventional Schmitt trigger circuit 119. When the signal S2 is present, the switch 115 is closed and the switch 116 is opened. The capacitor 118 then begins to charge, until the voltage has reached that at which the Schmitt trigger 119 responds, producing a positive pulse labeled END.

The time constant of the circuit comprising the resistor 117 and the capacitor 118, together with the level at which the Schmitt trigger 119 responds, are selected to produce a timed interval, such as one minute, during which the electronic flash circuit 70 continues to be charged if the flip flop 101 is set. If a picture is not taken during that interval, the charging of the flash unit 70 is interrupted. For this purpose, the pulse labeled END is applied to one input terminal of the OR gate 100, producing a pulse that resets the flip flop 101. When the flash unit 70 subsequently discharges enough to cause the signal $\overline{S2}$ to be produced, the switch 116 will be closed, thereby discharging the capacitor 118 and terminating the END pulse. When the flip flop 101 is reset, a positive level labeled CHARGE at its logic one output terminal is removed, serving to discontinue charging of the flash circuit 70 in a manner to be described below.

The signals D and $\overline{L2}$, produced by the gate 91 and the NOR gate 114, respectively, as described above, are applied to a conventional AND gate 120. When both input signals are present at logic one, the output terminal of the gate 120 goes high, supplying current through a resistor 121 and the light emitting diode 40 to ground. This circuit functions when the daylight pushbutton DPB is depressed and there is inadequate light to make a sharp hand-held exposure. The diode 40 then produces the illuminated indication, "USE FLASH" in the manner described above.

The signals F and $\overline{S2}$, produced in a manner described above, are applied to the input terminals of a conventional AND gate 122. When the flash pushbutton FPB is depressed and the electronic flash circuit is not charged, the gate 122 produces a logic one signal that is applied to one input terminal of an AND gate 124. The gate 124 has a second input terminal that receives the signal $\overline{L2}$. When the flash unit is not charged and the flash pushbutton is depressed, such that the gate 122 produces a logic one output signal, and the ambient light level is not high enough to make a hand-held exposure, so that the level $\overline{L2}$ is present, the gate 124 supplies current through a resistor 126 and through the light emitting diode 39 to ground to produce the visible signal "WAIT" as described above.

The active output terminal of an AND gate 123 is connected through a resistor 126 and the light emitting diode 38 to ground. When the gate 123 is enabled by the signal F and the level of ambient light is high enough to permit a daylight exposure, the gate 123 supplies current to the diode 38 to produce the visible signal "USE DAYLIGHT."

The signals FPD, $\overline{L2}$ and S2 are applied to the input terminals of AND gate 127. This gate initiates a flash exposure when the flash pushbutton is depressed, the flash unit circuit 70 is charged, and the ambient light level is low.

The active output terminal of the gate 127 is connected to the set input terminal S of a conventional flip flop 128, and to one input terminal of a conventional OR gate 129. The active output terminal of the gate 129 produces a signal labeled START in response to a logic one input signal applied to any of its input terminals. The START signal sets the flip flop 99, and also sets the flip flop 96 through the OR gate 95.

When set, the flip flop 99 produces a signal labeled OPEN that closes the switch 58 in FIG. 6 to actuate the solenoid SK1 and open the shutter. At some aperture during this opening procedure, depending on the focused distance, the switch SF in FIG. 6 will be closed.

Referring again to FIG. 7, when the switch SF is closed, a conventional one shot multivibrator 130 is triggered to produce a positive output pulse. This pulse is applied to one input terminal of an AND gate 131. A second input terminal of the gate 131 is connected to the logic one output terminal of the flip flop 128. When the flip flop 128 has been set by the gate 127, and the switch SF is closed, the gate 131 produces an output pulse labeled TR that is applied to one input terminal of the OR gate 100 described above. The gate 100 then produces a pulse to reset the flip flop 101, and the pulse TR, applied to the electronic flash circuit 70 in a manner to be described in more detail below, triggers the flash unit to produce a flash of light.

The pulse TR is also applied to one input terminal of a conventional OR gate 132 causing a positive pulse to appear at the output terminal of the gate 132 that resets the flip flop 99, producing the level $\overline{OPEN}$ and causing the shutter to begin to close. The gate 132 also receives the signals EE and RESET, produced as described above.

The signal OPEN, produced at the logic 1 output terminal of the flip flop 99 when that flip flop is set, is applied to the active input terminal of a conventional one shot multivibrator 80. When the flip flop 99 is reset, the falling transition produced at its logic 1 output terminal triggers the multivibrator 80, causing a positive pulse of, for example, three seconds, to be produced. This pulse is inverted by a conventional NOR gate 81, removing a positive level labeled $\overline{DELAY}$ from one input terminal of a conventional AND gate 98, for purposes to appear.

The pulse TE is also applied to one input terminal of an OR gate 79A. The RESET pulse is applied to a second input terminal of the gate 79A. The output terminal of the gate 79A is connected to the reset input terminal R of the flip-flop 96, to reset the flip-flop 96 in response to either of the pulses TE and RESET.

At the trailing edge of the pulse produced by the one shot multivibrator 130, a one shot multivibrator 133 is triggered to produce an output pulse. This pulse resets the flip-flop 128 through a conventional OR gate 134. A second input terminal of the gate 134 receives the RESET signal, causing the flip-flop 128 to be reset at the start of operations.

The signals DPD and L2 are applied to the input terminals of an AND gate 135. When these signals are both present at logic one, a positive signal labeled STOP is produced at the output terminal of the gate 135. This signal is applied to one input terminal of the OR gate 100, producing a pulse that resets the flip-flop 101. The STOP signal is also applied to one input terminal of the OR gate 129, causing the START signal to be produced. A third input terminal of the gate 129 receives the signal ETD, produced as described above when a time exposure is to be initiated.

The pulses FPD and DPD are applied to the input terminals of an OR gate 137. In response to either pulse, the gate 137 produces an output logic one pulse that is applied to one input terminal of a conventional AND gate 138. The gate 138 also has input terminals connected to receive the signals $\overline{S2}$ and $\overline{L2}$. Accordingly, when it is attempted to initiate either a flash exposure or a daylight exposure and the ambient light is too low and the flash circuit is not charged, the gate 138 sets the flip-flop 101 to produce a charge signal that will start charging the flash circuit 70 in a manner next to be described.

Referring to FIG. 8, the electronic flash circuit 70 includes any conventional voltage converter 140, to increase the battery voltage to a sufficiently high value, such as 350 volts, to charge a capacitor 141 in preparation for triggering the flash tube 8. The voltage converter 140 is supplied with current over a circuit extending from the supply terminal at B+ through the input circuit of the converter, and thence back over a lead 142 to the collector of a conventional NPN power transistor 143.

The emitter of the transistor 143 is returned directly to the negative terminal of the battery, so that the charging current does not have to flow through the switch 72 in FIG. 7. The base of the transistor 143 in FIG. 8 is connected to the logic one output terminal of the flip flop 101 in FIG. 7, to receive the positive signal labeled CHARGE when the flip flop 101 is set, thereby biasing the transistor 143 into saturation conduction.

The second output terminal 145 of the voltage converter 140 is connected through a rectifying diode 146 to a positive high voltage supply lead 147. A first path extends between the leads 147 and 144 through a current limiting resistor 148, the ready light 20, which may be a neon glow tube, and through a small resistor 149 to the terminal 144. A second path between the leads 147 and 144 is completed through the capacitor 141. The flash discharge tube 8 has its load terminals connected between the leads 147 and 144 as shown.

The trigger electrode 150 of the discharge tube 8, which may be of the conventional xenon filled type, extends through the high voltage secondary winding 151 of a pulse transformer 152 to the lead 144. Another path between the leads 147 and 144 extends from the lead 147 over a series path including a current limiting resistor 153, a capacitor 154, and a low voltage primary winding 155 of the transformer 152 to the lead 144.

The junction of the capacitor 154 and the resistor 153 is connected to the anode of a conventional silicon controlled rectifier 156. The cathode of the controlled rectifier 156 is connected to the lead 144.

The gate terminal of the silicon controlled rectifier 156 is returned to the lead 144 through a resistor 157. The gate terminal of the controlled rectifier 156 is also connected to the collector of a conventional PNP transistor 158. The emitter of the transistor 158 is connected through a relatively large resistor 159 to the lead 147, and through a relatively small resistor 160 to the terminal 144.

The resistors 159 and 160 serve as a potential divider to reduce the voltage across the transistor 158. The base of the transistor 158 is connected through a biasing resistor 161 to the junction of the resistors 159 and 160. The base of the transistor 158 is returned to ground through the load terminals of a conventional electronic switch 162. The switch 162 is closed when the pulse TR is applied to its control terminal.

A charge sensing circuit extends from the supply terminal at B+ through the resistor 149, and thence through a Zener diode 163 and a resistor 164 to ground. The active input terminal of a conventional Schmitt trigger circuit 165 is connected to the anode of the Zener diode 163. The components are selected so that when the capacitor 141 is charged to a predetermined value such that the ready light 20 is conducting current, the increased voltage across the resistor 149 will cause the Zener diode 163 to break down, causing current to flow through the resistor 164. At a predetermined value of the voltage across resistor 164, the Schmitt trigger 165 will respond to produce the signal S2 that indicates that the electronic flash circuit is charged and ready for use. Thereafter, when a pulse TR is produced, closing the switch 162, the transistor 158 will be gated into conduction, supplying gate current to the controlled rectifier 156. That will cause the abrupt discharge of the capacitor 154 through the primary winding 155 of the transformer 152, triggering the flash tube 8 into conduction and causing the capacitor 141 to discharge through it and produce an illuminating flash of light.

Having thus described the construction of the apparatus of the invention, its operation under typical circumstances will next be described with reference to FIGS. 1–8. It will be assumed that the camera is loaded with film but that the operator has not yet picked it up so that the switch SPB is open. The switch 72 in FIG. 7 will be open, and essentially no power will be drawn by the apparatus. It will be assumed that the flash storage capacitor 141 is initially discharged.

Assume now that the operator picks up the camera, closing the grip switch SPB. That will cause the switch 72 to be closed through the OR gate 74, and the one shot multivibrator 79 will be triggered to produce the RESET pulse. Closing the switch 72 results in the supply of operating energy to the various logic circuits in FIG. 7. During the RESET pulse, the flip-flops 96, 99, 101 and 128 in FIG. 7 will be reset.

Assume next that the operator decides to make a daylight exposure and proceeds to view and frame the subject and to focus the lens with the knob 5 in FIG. 1. He will then depress the daylight pushbutton DPB in FIG. 1.

Referring now to FIG. 7, the operation that follows will depend on the ambient light conditions. The first operation that takes place is that depressing the switch DPB with the flip-flop 96 reset will cause the level D to be produced, over a circuit comprising the closed switch 83, contact $b$ of the switch DPB, and contact $c$ of the switch FPB, thus causing a low potential to be applied to the NOR gate 91 that will produce the positive signal D. This signal will persist as long as the pushbutton DPB is held down and the flip-flop 96 remains reset. The signal D will be applied to the OR gate 106 to close the switch 107 and apply operating potential to the photocells PC1 and PC2.

With the shutter closed at this time, and the $\overline{OPEN}$ present to close the switch 109, the capacitor 108 will be discharged and no input signal will be applied to the Schmitt trigger 110. Depending on the incident light level applied to the photocell PC2, either the level L2 or the level $\overline{L2}$ will be produced.

If the level $\overline{L2}$ is produced, indicating that the ambient light is inadequate for a sharp hand-held daylight exposure, the only further action that will take place is that the AND gate 120 will cause the illumination of the light emitting diode 40, producing the visible indication "USE FLASH" as seen in the viewfinder of FIG. 5.

If the level L2 is present, after the interval determined by the duration of the pulse produced by the multivibrator 90, the multivibrator 93 will produce a pulse DPD. This pulse, applied to the gate 135 together with the signal L2, will produce the signal STOP.

The STOP pulse is applied through the OR gate 100 to the flip flop 101, but since that flip flop is already reset, it will not change state. The STOP pulse is also applied to the gate 129 to produce a START signal. This signal will set the flip flop 99, and will set the flip flop 96 through the OR gate 95.

Setting the flip flop 99 will remove the level $\overline{BUSY}$ from the control terminal of the switch 83, opening that switch so that further manipulation of the pushbuttons will have no effect until after an exposure has been completed. The signal OPEN, produced at the logic 1 output terminal of the flip flop 99, will close the switch 58 in FIG. 6, causing the solenoid 57 to be energized and the shutter to begin to open.

Returning to FIG. 7, with the flip flop 99 set the switch 109 will be open and the capacitor 108 will begin to accumulate charge at a rate determined by the ambient light level. The circuit will be closed to supply current to the photocell PC1 at this time over the load terminals of the switch 107, closed by the OR gate 106 in response to the level BUSY produced at the logic 1 output terminal of the flip flop 96.

When sufficient charge has been accumulated by the capacitor 108 to indicate that the film has been properly exposed, the Schmitt trigger 110 will produce the signal EE. That signal will act through the OR gate 132 to reset the flip flop 99, causing the shutter solenoid to be de-energized in FIG. 6. Resetting the flip flop 99 will trigger the one shot multivibrator 80, producing a timed pulse that will disable the AND gate 98 for a few seconds to inhibit accidental double exposure. At the trailing edge of this delay pulse, the one shot multivibrator 82 will be triggered to produce the pulse TE. The pulse TE will reset the flip flop 96 in FIG. 7 to remove the signal BUSY and produce the signal $\overline{BUSY}$, closing the switch 83 to prepare for the next exposure. The operator may then change the film in any conventional manner to prepare for the next exposure.

When the signal $\overline{L2}$ is present, and the pulse DPD is produced by the one shot multivibrator 93, the pulse DPD, applied through the OR gate 137 to the AND gate 138 in the presence of both the signals $\overline{S2}$ and $\overline{L2}$, will set the flip flop 101 to produce the signal CHARGE. That will bias the transistor 143 in FIG. 8 into conduction, initiating charging of the flash unit.

After an interval suitable for charging the capacitor 141 in FIG. 8, the ready light will glow, and shortly thereafter, the Schmitt trigger 165 will produce the signal S2. If, under these conditions, the operator again depresses the pushbutton DPB, the signal "USE FLASH" will be produced as described above. In this instance, however, with the ambient light at the low level which produces the signal $\overline{L2}$, the gate 135 will be disabled and the STOP pulse will not be produced.

If the operator does nothing further for the time period required to operate the Schmitt trigger 119, after the timing interval started by production of the signal S2 to close the switch 115 and open the switch 116 in FIG. 7, the Schmitt trigger 119 will produce the END pulse to reset the flip flop 101 through the gate 100. That will stop the flash unit from charging, although it will continue to function until the current through the resistor 164 in FIG. 8 becomes inadequate to operate the Schmitt trigger 165, whereupon the signal $\overline{S2}$ will be produced.

Assuming that when the flash unit was discharged as described above, and within the timing interval before the Schmitt trigger 119 responds, the operator decides to take a flash picture and depressed the pushbutton FPB with the pushbutton DPB released. The signal F will then be produced by the gate 87, causing the switch 107 to be closed through the OR gate 106. Assuming a low light level condition to prevail, the signal L2 will be present. Under those conditions, when the pulse FPD is produced by the one shot multivibrator 89, the gate 127 will be enabled to set the flip-flop 128, and to set the flip-flop 99 through the OR gate 129 to start an exposure by opening the shutter.

At the aperture selected by the distance to which the camera is focused as described above, the switch SF in FIGS. 6 and 7 will be closed. When the switch SF closes, the multivibrator 130 in FIG. 7 will be triggered to produce an output pulse. This pulse, with the flip flop 128 set, will cause the gate 131 to produce a pulse TR. This pulse will reset the flip flop 101 through the gate 100. It will also reset the flip flop 99 through the gate 132.

Referring to FIG. 8, the switch 162 will be closed by the pulse TR, triggering the flash tube 8 as described above, causing the abrupt discharge of the capacitor 141 through the tube 8. The illuminating flash so produced can be of short duration, such as one millisecond, so that it will occur at the desired shutter aperture as the shutter is beginning to close. Depending upon the exact operating time cycle of the shutter, the switch SF may be arranged to close just before or just after the desired average exposure aperture has been reached. Resetting the flip flop 99 will initiate a delay period as described above, following which the flip flop 96 will be reset to end the exposure cycle as before.

Next, assume that the operator decides to take another flash picture, after changing the film, and the flash circuit is now uncharged and the light level remains low. Under these circumstances, when the pushbutton FPB is depressed with the pushbutton DPB released, the pulse F then produced by the gate 87 will close and the AND gate 122 will produce an output logic 1 signal, which applied to the gate 124, in the presence of the signal will produce the visible indication "WAIT." The subsequently produced pulse FPD, produced by the multivibrator 89, and applied through the gate 137 to the AND gate 138 in the presence of the signals $\overline{L2}$ and $\overline{S2}$, will set the flip flop 101 to begin the flash charge cycle. After the time required to charge the flash unit and produce the signal S2, the circuit will operate as described above in response to the depression of pushbutton FPB. The interval required to charge the flash unit may be, for example, ten seconds. However, in the meanwhile, depression of the pushbutton FPB with the pushbutton DPB released, will produce an operation sequence the same as would be produced if the operator had picked up the camera initially and pushed the pushbutton FPB. In particular, if the light level remains low, such that the signal $\overline{L2}$ is produced, the second depression of the pushbutton FPB will produce the same results as just described, although with the flip flow 101 already set, no change will be made. The pulse FPD will be inhibited from starting an exposure cycle by the absence of the signal S2 at the input terminal of the AND gate 127.

However, assuming that the ambient light level changes to a high value, such that the signal L2 is produced, with the pushbutton FPB depressed, the signal F produced by the gate 87 and applied to the AND gate 123 together with the signal L2, will cause the indication "USE DAYLIGHT" to be produced. It is not desired to make a flash exposure under these conditions because to do so could result in an overexposure if the ambient light level is high enough.

Under certain conditions of high ambient light levels, if may be desirable to take a flash exposure anyway. For example, if the camera is focused on a close object, calling for a small flash aperture, the operator can photograph it with electronic flash by closing the photocell window 17 in FIG. 1 with one finger, so that the signal $\overline{L2}$ instead of L2 is produced in FIG. 7 when the pushbutton FPB is depressed.

Assume next that the operator desires to make a time exposure. For this purpose, after the camera is loaded and focused, the operator simultaneously depresses the button FPB and DPB. If constructed as described above, the operation need not be exactly simultaneous, but simply close enough together so that contact c of the pushbutton FPB is disengaged before the contact b of the pushbutton DPB is engaged.

When the contacts b of both pushbuttons FPB and DPB are engaged by their respective armatures, the one shot multivibrator 94 will be triggered to produce the pulse T. This pulse will act through the gate 95 to immediately set the flip flop 96, producing the level BUSY. The BUSY signal performs a number of functions under these conditions. First, it holds the switch 72 closed through the gate 74. This permits the operator to put the camera down, either for support or to get into the picture himself, and thereby release the grip switch SPB without shutting down the camera.

At the trailing edge of the pulse T, the multivibrator 97 will produce an output pulse, which, in the presence of the signal $\overline{OPEN}$ with the shutter closed, and the signal $\overline{DELAY}$ will cause the gate 98 to produce a pulse labeled TD. This pulse will act through the gate 100 to reset the flip flop 101 if it happens to be set.

The trailing edge of the pulse TD will trigger the multivibrator 103 to produce the time delay signal described above. At the end of this period, the one shot multivibrator 104 will produce its output pulse, and in the presence of the signal BUSY, the gate 105 will produce a pulse ETD.

The second reason for setting the flip flop 96 is to open the switch 83 so that any contact opening and closing sequence that occurs as the operator releases the pushbuttons will not cause improper operation.

The pulse ETD will produce a START pulse from OR gate 129 as described above. That will set the flip flop 99, causing the shutter to open. The BUSY signal, applied through the gate 106 to the switch 107, will hold that switch closed, and the signal $\overline{OPEN}$ will be removed from the switch 109 to enable the timing circuit to start timing until an adequate light accumulation has been sensed to cause the Schmitt trigger 110 to produce the signal EE, causing the shutter to be closed. After the delay sequence described above, the flip flop 96 will be reset to remove the signal BUSY. The apparatus will then be returned to its standby state.

The above concludes the description of the intended modes of operation of the apparatus. If the operator deliberately fully depresses one of the shutter buttons before depressing the other one sufficiently to open its normally closed contact, various other operating sequences can be produced. As noted above, the pushbuttons DPB and FPB are constructed so that it is quite difficult to accidentally initiate a sequence of this kind, and, as will appear, the camera is constructed so that a proper exposure will be made unless the operator is extremely persistent even though one of these undesired modes of operation is deliberately carried out.

First, assume that the flash pushbutton FPB is fully depressed and held depressed, and that the daylight DPB is then depressed, under low ambient light conditions with the flash unit uncharged so that the signal $\overline{S2}$ is present. As soon as the pushbutton FBP is fully depressed, the signal F will be produced by the gate 87 as described above, and the "WAIT" indication will be produced by illumination of the light emitting diode 39. The flash exposure will not be initiated by the succeeding pulse FPD produced by the multivibrator 89, because the absence of the signal S2 at the gate 127 will inhibit that gate and prevent setting of the flip flop 99 through the gate 129. When the pushbutton DPB is subsequently depressed with the pushbutton FPB still fully depressed, a time exposure will be initiated as before.

Assume next that the same thing is done except that the light level is high and the flash unit is charged. The visual signal "USE DAYLIGHT" will be produced by the light emitting diode 38 as described above, and a flash exposure will not be initiated by the gate 127 because the signal $\overline{L2}$ is not present. When the pushbutton DPB is depressed with the flash pushbutton FPB still depressed under these conditions, a time exposure will be produced, even though it may be a very short one.

When the pushbutton FPB is first depressed and the pushbutton DPB is then depressed with the flash unit charged and the light level low, as soon as the pushbutton FPB is first depressed, the multivibrator 86 will be triggered, and at the trailing end of its pulse the multivibrator 89 will produce the pulse FPD. This pulse will occur before a time exposure pulse produced by the gate 97 can be produced, and will cause the gate 127 to set the flip flop 99 through the OR gate 129 to open the shutter for a flash exposure, which will otherwise proceed as described above. The START pulse produced by the gate 129 during this process will set the flip flop 96 through the OR gate 95, producing the signal BUSY that will open the switch 83, and this can be readily arranged to occur before it is physically possible for the operator to move the pushbutton DPB from its fully released to its fully closed position.

During the flash exposure, when the switch SF is closed to trigger the one shot multivibrator 130, the gate 131 will produce a signal TR that will trigger the flash unit as before, and will reset the flip flop 99 through the OR gate 132 to remove the level OPEN, thereby de-energizing the shutter solenoid.

As the signal OPEN starts toward ground, the transition will trigger the multivibrator 80 to produce the delay pulse, as described above. During this interval, the flip-flop 96 will remain set so that no time exposure can be initiated because the switch 83 is open. At the end of the delay pulse, the multivibrator 82 will be triggered to reset the flip flop 96 and the gate 81 will enable the gate 98. A double exposure could not be produced in this way unless the operator deliberately held down both buttons for the entire interval before the BUSY flip flop 96 is reset.

If the daylight pushbutton is fully depressed before the contact c of the pushbutton FPB is disengaged, and the pushbutton FPB is then fully depressed while the pushbutton DPB is held down, under high light level conditions a normal daylight exposure will be produced as described above. The switch 83 will be opened by setting the flip flop 96 before the operator can move the pushbutton FPB through its full range. The flip flop 96 will remain set until the end of the delay interval following the completion of the daylight exposure, so that a time exposure following the daylight exposure cannot be produced unless the operator deliberately holds both buttons down through the entire interval, or unless he deliberately elects to make a double exposure by making a time exposure after the daylight exposure in the usual way.

Assuming that the pushbutton DPB is fully depressed, and the pushbutton FPB is then actuated to its fully depressed position, and the light level is low, a normal time exposure will be produced, with the signal "USE FLASH" being produced by the light emitting diode 40 as described above, during the interval between the full depression of the pushbutton DPB and the disengagement of the contact c of the pushbutton FPB. This may be an interval too short to notice, or, if desired, the operator may deliberately elect to follow this mode of operation when he is not certain whether or not the light level is high enough for a hand-held exposure. For this purpose, the operator can focus and frame, then push the pushbutton DPB as though he were to make a normal daylight exposure. If there is enough light, that will occur. Otherwise, he will get the indication to use flash, and he can then elect to make a time exposure by holding the pushbutton DPB down and fully depressing the pushbutton FPB.

While the invention has been described with respect to the details of a particular embodiment thereof, many changes and variations will occur to those skilled in the art upon reading this description, and such may be obviously be made without departing from the scope of the invention.

What is claimed is:

1. In combination with a camera having shutter means operable to make an exposure by opening and closing an optical path in said camera, rechargeable electronic flash means effective when charged to produce an illuminating flash of light in response to an applied trigger signal, charging means operable to charge said flash means, charge sensing means for producing a first signal when said flash means is charged and a second signal when said flash means is not charged, register means settable to first and second states, means controlled by said register means in its first state for operating said charging means to charge said flash means, light sensing means responsive to the level of ambient light confronting said camera for producing a third signal when said level is above a predetermined value and a fourth signal when said level is below said predetermined value, first control means manually operable from a first state to a second state, second control means manually operable from a first state to a second state, means operated by both said control means and said light sensing means for producing a fifth signal when said first control means is in its second state, said second control means is in its first state and said third signal is present, means responsive to said fifth signal for operating said shutter means, means operated by said control means, said charge sensing means and said light sensing means for producing a sixth signal when said first control means is in its first state, said second control means is in its second state, and said first and fourth signals are present, means responsive to said sixth signal for operating said shutter means, means enabled by said sixth signal and controlled by said shutter means for applying a trigger signal to said flash means, means responsive to said trigger signal for setting said register means to its second state, and means controlled by said control means and said sensing means for setting said register means to its first state when said first control means is in its first state, said second control means is in its second state, and said second and fourth signals are present.

2. The apparatus of claim 1, in which said means for setting said register to its second state includes means responsive to said fifth signal for setting said register to its second state.

3. The apparatus of claim 1, in which said means for setting said register to its first state includes means effective when said register is in said second state and operated by said control means and said light sensing means for setting said register to its first state when said first control means is in its second state, said second control means is in its first state, and said fourth signal is present.

4. The apparatus of claim 3, in which said means for setting said register to its second state includes means responsive to said fifth signal for setting said register to its second state.

5. The apparatus of claim 1, further comprising first visual indicating means operated by said control means and said sensing means for producing a first visible signal when said first control means is in its second state, said second control means is in its first state, and said first and said fourth signals are present, second visual indicating means operated by said control means and said light sensing means for producing a second visible signal when said first control means is in its first state, said second control means is in its second state, and said third signal is present, and third visual indicating means operated by said control means and said sensing means for producing a third visible signal when said first control means is in its first state, said second control means is in its second state, and said second and said fourth signals are present.

6. A photographic camera apparatus of the type which may be used with a source of artificial illumination; said camera comprising:
a housing having a scene light admitting aperture therethrough;
means for defining a film exposure plane within said housing;
means for blocking and unblocking the impingement of scene light on said exposure plane from said aperture to define a photographic exposure interval;
first manually operable and electrically energizable control means for providing a first signal responsive to the manual operation thereof;
second manually operable and electrically energizable control means for providing a second signal responsive to the manual operation thereof;
scene light detecting means for providing a select output signal responsive to the detection of ambient scene light above a predetermined level; and
electrically energizable circuit means, responsive to said first signal resulting from the manual operation of said first control means without the manual operation of said second control means in the presence of said select output signal from said scene light detecting means, for actuating said scene light blocking and unblocking means to effect a photographic exposure cycle, said circuit means being alternately responsive to said first signal in the absence of said select output signal from said scene light detecting means for enabling the source of artificial illumination from its normal state of unreadiness to a state of readiness thereby accommodating its illumination upon application of an appropriate trigger signal thereto, said circuit means also being responsive to said second signal resulting from the manual operation of said second control means without the manual operation of said first control means in the absence of said select output signal from said scene light detecting means for also enabling the source of artificial illumination from its normal state of unreadiness to a state of readiness when said source of artificial illumination is already in said state of unreadiness and alternatively for actuating said scene light blocking and unblocking means for effecting a photographic exposure cycle while also providing said trigger signal to cause the illumination of the source of artificial illumination during the exposure cycle when the source of artificial illumination is already in said state of readiness.

7. The photographic apparatus of claim 6 wherein said circuit means includes means responsive to a subsequent reappearance of said first signal resulting from a second manual operation of said first control means following a first manual operation of said first control means while in the absence of said select signal from said scene light detecting means, said second manual operation of said first means occurring without the operation of said second control means while also in the absence of said select output signal from said scene light detecting means for returning the source of artificial illumination to its said state of unreadiness.

8. The photographic apparatus of claim 6 wherein said circuit means includes means responsive to said first signal in the absence of said select output signal from said scene light detecting means for providing a third signal indicative of when the ambient scene light is inadequate for a photographic exposure cycle without artificial illumination, said circuit means also including means responsive to said second signal in the presence of said select output signal from said scene light detecting means for providing a fourth signal indicative of when the ambient scene light is adequate for a photographic exposure cycle without artificial illumination, said photographic apparatus also including normally inoperative means for producing a readily discernable signal to the camera operator in response to said third and fourth signals.

9. The photographic apparatus of claim 8 wherein said circuit means includes means responsive to said second signal in the absence of said select output signal from said scene light detecting means when the source of artificial illumination is in a state of unreadiness for providing a readily discernable signal to the camera operator to wait for the source of artificial illumination to be changed to a state of readiness.

10. The photographic apparatus of claim 6 wherein the source of artificial illumination is a strobe and the strobe is enabled to a state of readiness by being fully charged.

11. The photographic apparatus of claim 6 wherein the circuit means includes means responsive to the simultaneous occurrence of said first and second signals resulting from the simultaneous manual operation of said first and second control means for actuating said scene light blocking and unblocking means to effect a photographic exposure cycle subsequent to the expiration of a predetermined time delay after the manual operation of said first and second control means.

12. The photographic apparatus of claim 11 including: third manually operable and electrically energizable control means for simultaneously controlling the electrical energization of said first and second control means as well as said circuit means in response to normal gripping of the camera apparatus by a user wherein said circuit means additionally responds to the simultaneous occurrence of said first and second signals for maintaining said electrical energization of said first and second control means as well as said circuit means regardless of the manual operation of said third control means.

13. A photographic camera apparatus of the type which may be used with a source of artificial illumination; said camera comprising:

a housing having a scene light admitting aperture therethrough;

means for defining a film exposure plane within said housing;

means for blocking and unblocking the impingement of scene light on said exposure plane from said aperture to define a photographic exposure interval;

first manually operable and electrically energizable control means for providing a first signal responsive to the manual operation thereof;

second manually operable and electrically energizable control means for providing a second signal responsive to the manual operation thereof;

scene light detecting means for providing a select output signal responsive to the detection of ambient scene light above a predetermined level; and electrically energizable circuit means responsive to said first signal resulting from the manual operation of said first control means without the manual operation of said second control means in the presence of said select output signal from said scene light detecting means for actuating said scene light blocking and unblocking means to effect a photographic exposure cycle, said circuit means also being responsive to said second signal resulting from the manual operation of said second control means without the manual operation of said first control means in the absence of said select output signal from said scene light detecting means for actuating said scene light blocking and unblocking means for effecting a photographic exposure cycle while also providing a trigger signal for effecting the illumination of the source of artificial illumination during the exposure cycle, said circuit means additionally being responsive to the simultaneous occurrence of said first and second signals resulting from the simultaneous manual operation of said first and second control means for actuating said scene light blocking and unblocking means to effect a photographic exposure cycle subsequent to the expiration of a predetermined time delay after the simultaneous manual operation of said first and second control means.

14. The photographic apparatus of claim 13 including: third manually operable and electrically energizable control means for simultaneously controlling the electrical energization of said first and second control means as well as said circuit means in response to normal gripping of the camera apparatus by a user wherein said circuit means additionally responds to the simultaneous occurrence of said first and second signals for maintaining said electrical energization of said first and second control means as well as said circuit means regardless of the manual operation of said third control means.

15. A photographic camera apparatus of the type which may be used with a source of artificial illumination and which may also provide three different photographic exposure modes of operation including ambient and artificial scene lighted exposure cycles wherein said camera comprises:

a housing having a scene light admitting aperture therethrough;

means for defining a film exposure plane within said housing;

means for blocking and unblocking the impingement of scene light on said exposure plane from said aperture to define a photographic exposure interval;

first manually operable and electrically energizable control means for providing a first signal responsive to the manual operation thereof;

second manually operable and electrically energizable control means for providing a second signal responsive to the manual operation thereof; and electrically energizable circuit means, responsive to said first signal resulting from the manual operation of said first control means without the manual operation of said second control means, for effecting a first of said three different photographic exposure modes of operation, said circuit means also being responsive to said second signal resulting from the manual operation of said second control means without the manual operation of said first control means for effecting a second of said three different photographic exposure modes of operation, said circuit means further being responsive to the simultaneous manual operation of said first and second control means for effecting a third of said three different photographic exposure modes of operation.

16. A photographic camera apparatus of the type which may be used with a source of artificial illumination; said camera comprising:

a housing having a scene light admitting aperture therethrough;

means for defining a film exposure plane within said housing;

means for blocking and unblocking the impingement of scene light on said exposure plane from said aperture to define a photographic exposure interval;

manually operable and electrically energizable control means for providing a signal responsive to the manual operation thereof;

scene light detecting means for providing a select output signal responsive to the detection of ambient scene light intensity above a predetermined level; and electrically energizable circuit means, responsive to said signal resulting from the manual operation of said control means in the presence of said select output signal from said scene light detecting means, for actuating said scene light blocking and unblocking means to effect a photographic exposure cycle, said circuit means being alternately responsive to said signal resulting from the manual operation of said control means in the absence of said select output signal from said scene light detecting means for enabling the source of artificial illumination from its normal state of unreadiness to a state of readiness thereby accommodating its illumination upon application of an appropriate trigger signal thereto.

17. The photographic apparatus of claim 16 wherein said circuit means includes means responsive to a subsequent reappearance of said signal resulting from a second manual operation of said control means following a first manual operation of said control means while in the absence of said select signal from said scene light detecting means, said second manual operation of said control means occurring while also in the absence of said select output signal from said scene light detecting means for returning the source of artificial illumination to its normal state of unreadiness.

18. A photographic camera apparatus of the type which may be used with a source of artificial illumination; said camera comprising:

a housing having a scene light admitting aperture therethrough;

means for defining a film exposure plane within said housing;

means for blocking and unblocking the impingement of scene light on said exposure plane from said aperture to define a photographic exposure interval;

manually operable and electrically energizable control means for providing a signal responsive to the manaul operation thereof;

electrically energizable circuit means, responsive to said signal resulting from the manual operation of said control means for enabling the source of artificial illumination from its normal state of unreadiness to a state of readiness thereby accommodating its illumination upon application of an appropriate trigger signal thereto; said circuit means also being responsive to a subsequent reappearance of said signal resulting from a second manual operation of said control means following a first manual operation of said control means as well as the completion of the enablement of the source of artificial illumination into its state of readiness, said second manual operation of the control means operating to actuate said scene light blocking and unblocking means for effecting a photographic exposure interval while also providing said trigger signal to cause the illumination of the source of artificial illumination during the exposure interval; and normally inoperative means for producing a readily discernable signal to the operator in response to said source of artificial illumination reaching its state of readiness.

19. A photographic camera apparatus of the type which may be used with a source of artificial illumination; said camera comprising:

a housing having a scene light admitting aperture therethrough;

means for defining a film exposure plane within said housing;

means for blocking and unblocking the impingement of scene light on said exposure plane from said aperture to define a photographic exposure interval;

first manually operable and electrically energizable control means for providing a first signal responsive to the manual operation thereof;

second manually operable and electrically energizable control means for providing a second signal responsive to the manual operation thereof;

scene light detecting means for providing a select output signal responsive to the detection of ambient scene light above a predetermined level;

electrically energizable circuit means, responsive to said first signal resulting from the manual operation of said first control means without the manual operation of said second control means in the presence of said select signal from said scene light detecting means, for actuating said scene light blocking and unblocking means to effect a photographic exposure cycle, said circuit means also being responsive to said second signal resulting from the manual operation of said second control means without the manual operation of said first control means in the absence of said select output signal from said scene light detecting means for effecting a specific function associated with the artificial illumination of a subject during a photographic exposure cycle, said circuit means alternatively being responsive to said second signal from the manual operation of said second control means without the manual operation of said first control means in the presence of said select output signal from said scene light detecting means for terminating any further functions relative to the implementation of a photographic exposure cycle.

20. The photographic apparatus of claim 19 wherein said circuit means includes means responsive to said second signal from the manual operation of said second control means without the manual operation of said first control means in the presence of said select output signal from said scene light detecting means for providing a third output signal, said photograhic apparatus further including normally inoperative means for producing a readily discernable signal indicating to the camera user that he should now manually operate said first control means in response to said third output signal from said circuit means.

* * * * *